United States Patent
Uchiyama et al.

[15] 3,683,769
[45] Aug. 15, 1972

[54] AUTOMATIC FLASH CIRCUIT
[72] Inventors: Takashi Uchiyama; Tadashi Ito, both of Kanagawa-ken; Mutsuhide Matsuda, Tokyo, all of Japan
[73] Assignee: Canon Kabushiki Kaisha, Tokyo, Japan
[22] Filed: June 16, 1970
[21] Appl. No.: 46,733

[30] Foreign Application Priority Data

June 23, 1969 Japan ................44/49788

[52] U.S. Cl............95/11.5 R, 95/10 CE, 95/10 CT, 95/53 EB
[51] Int. Cl..................G03b 15/03, G03b 9/62
[58] Field of Search......95/11.5, 10 C, 53 EB, 10 CE

[56] References Cited

UNITED STATES PATENTS 3,418,904  12/1968  Wick et al..............95/11.5 X

Primary Examiner—Samuel S. Matthews
Assistant Examiner—Russell E. Adams, Jr.
Attorney—McGlew and Toren

[57] ABSTRACT

In the automatic camera flash circuit disclosed a start switch actuates a time constant circuit. A first semiconductor circuit, controlled by the time constant circuit, operates an electromagnet. A power source and a second semiconductor circuit actuates a flash device. The flash device is controlled by the time constant circuit through the second semiconductor circuit.

15 Claims, 3 Drawing Figures

AUTOMATIC FLASH CIRCUIT

The present invention relates to an automatic flash circuit for a camera, and particularly for a camera having a shutter blade which also functions as a diaphragm blade, in which a synchronous semiconductor actuates a flashing device.

In a flash circuit for a camera disclosed in Japanese Pat. publication No. 454902, the flash peak is made to correspond to the deenergization of an electromagnet for shutter closure.

The above conventional flash circuit is not suitable for a flash device using a discharge tube for illumination because the discharge tube is actuated for illumination immediately after triggering. In a flashing circuit with a discharge tube, a flash peak appears immediately after triggering. Thus if a signal corresponding to a signal for shutter closure is used for triggering the flash device with a discharge tube, the time required for shutter actuation is shortened just as in the prior art, because the shutter closure begins in the course of shutter opening. In another prior art disclosed in Japanese Pat. publication No. 4412668, the triggering for a flashing device is effected by a contact switch associated with shutter closure.

In the present invention, a semiconductor element is provided for the triggering of a flashing device in a simplified circuit construction.

The present invention will be described in detail referring to the attached drawings in which:

In FIG. 1 through FIG. 3, same elements are given same designations and their functional explanations are made chiefly in reference to FIG. 1 and unnecessary overlapping explanations are avoided.

Figure 1:
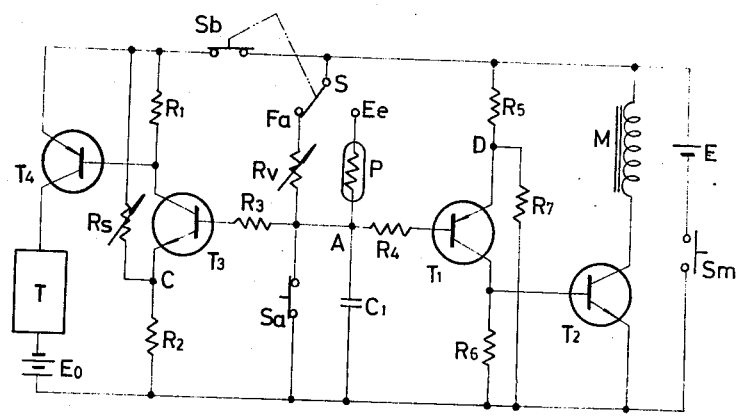
FIG. 1 shows a flashing circuit diagram of an embodiment of the present invention.

In FIG. 1, the member E is a first low voltage battery for the circuit, $E_o$ is a second high voltage battery which serves only for the flash device with the aid of the battery E, P is a photoconductor, for example of Cds, $C_1$ is a timer resistor, $R_v$ is a variable capacitor for setting a photographing information such as film sensitivity, an object distance or a guide number, two transistors $T_1$ and $T_2$ combined, and two transistors $T_3$ and $T_4$ combined form respectively a first semiconductor circuit and a second semiconductor circuit. In both the first and second semiconductor circuits the transistor at the input stage, for example, of P-N-P type is of opposite polarity to the transistor at the output state of N-P-N type for example. Member M is an electromagnet for shutter actuation, T is a flash device, shown in FIG. 1 with a discharge tube for illumination, S is a change-over switch for photographing a scene either under automatic flash actuation or automatic shutter speed control. Members $E_e$ and $F_a$ are terminals for automatic exposure control and automatic flash actuation respectively.

Member $Sb$ is a flash activator switch associated with the change-over switch S, so as to close the activator switch $Sb$ only when the change-over switch contacts with the terminal $Fa$. A resistor $R_s$ is variable for adjusting or changing a triggering time of the flash device T. The variable resistor $R_s$ and the resistor $R_2$ connected, and the resistors $R_5$ and $R_7$ combined form respective bleeder circuits for controlling triggering time of both the first and second semiconductor circuits. A start switch separates a time constant circuit constituted by the photoconductor P and the timer capacitor $C_1$ or the variable resistor $R_v$ and the timer capacitor $C_1$. Suitable means open the start switch $Sa$ as the shutter is opened, and close the switch as the shutter is closed, thus assuring resetting of the timer circuit. A switch energizes $Sm$ the circuit, which is closed while a shutter button is pressed down and is opened in association with the shutter closure.

With the above circuit arrangement, an input potential at a connecting point A is compared with a first reference potential at a connecting point D in the bleeder circuit composed of $R_5$ and $R_7$, and is compared with a second reference potential at a connecting point C in the bleeder circuit composed of $R_s$ and $R_2$ only when the activator switch $Sb$ is closed. When the switch S contacts the terminal $Fa$ and the activator switch $Sb$ is closed simultaneously, and when the start switch $Sa$ is opened at the beginning of the opening of the shutter, the charging of the capacitor $C_1$ causes a gradually increasing potential at the connecting point A. After a given time when the potential at A exceeds the potential at C or D, the semiconductor circuit composed of the transistors $T_3$ and $T_4$ or the semiconductor circuit composed of the transistors $T_1$ and $T_2$ is inverted to actuate the flashing device T or deenergize the electromagnet M to effect shutter closure.

When the change-over switch S contacts the terminal $E_e$ and the activator switch $Sb$ is opened, the variable resistor $R_v$ forming one time constant circuit is replaced with the photoconductor P forming another time constant circuit, including the same timer capacitor $C_1$. As a result, an automatic shutter speed control is assured through the first semiconductor circuit; that is the magnet M is deenergized for shutter closure after a certain time depending on the brightness of an object.

It is possible to control the actuating time of the flash device through the change of the actuating level of the transistor $T_3$ for the transistor $T_1$ by adjusting the resistance value of the variable resistor $R_s$ in the bleeder circuit of the variable resistor $R_s$ and the resistor $R_2$. Therefore, when the variable resistor $R_s$ is provided so as to maintain the actuating level of the transistor $T_1$ equal to that of the transistor $T_3$, the transistor $T_3$ may be used as a synchronizer switch, and when the variable resistor $R_s$ is adjusted so as to assure the transistor $T_3$ actuates earlier than the transistor $T_1$, the transistor $T_3$ may be used as a flash switch of the flash valve by adjusting or exchanging the variable resistor $R_s$. In this case, the resistors $R_3$ and $R_4$ contribute to stabilizing the first and second semiconductor circuits respectively. For this purpose, it is derivable that a relatively large resistance value is selected both for the resistors $R_3$ and $R_4$.

Figure 2:
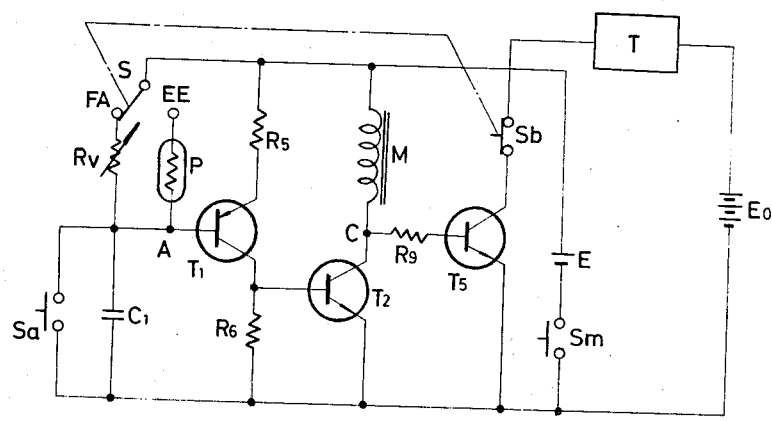
FIGS. 2 and 3 show respectively a modification of the circuit shown in FIG. 1.

In FIG. 2 which shows a modification of the embodiment shown in FIG. 1. $R_9$ is a resistor for preventing current flow from the magnet M to a power transistor $T_5$, the output circuit of which is connected in series with a triggering circuit in a flash device T. In this way, when a magnet M is energized, the potential at the base of the transistor $T_5$ lowers and the triggering circuit in the flash device T is not activated. Instantaneously after the closing of the main switch $Sm$ but before the opening of the start switch Sa, when power is not supplied to the magnet M the base potential of the power transistor $T_5$, namely the potential at the point C is increased to the level of the voltage of the power source E. The current flows through the triggering circuit in the flash device T and a discharge tube in the flashing device is illuminated.

Figure 3:
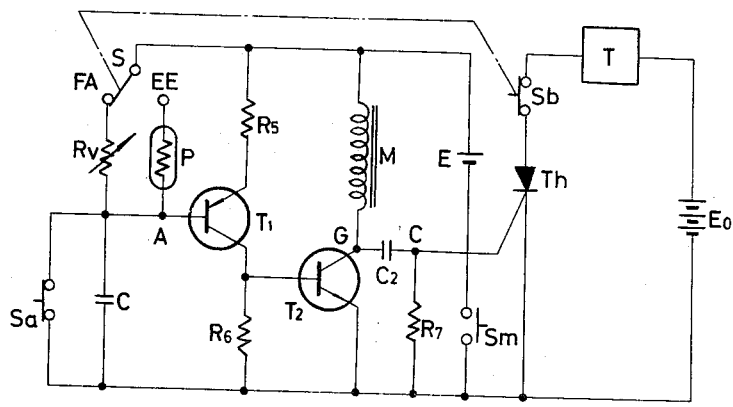

In FIG. 3 which shows a modification of the circuit shown in FIG. 2, a thyristor Th is used in place of the transistor $T_5$ in FIG. 2. When the magnet M is deenergized, the potential at the point G is instantaneously increased to the level of the potential of the power source E, and the potential at the point C connected to the point G through a capacitor $C_2$ is instantaneously increased to the level of the potential at the point G to open the triggering circuit in the flashing device T with the aid of a resistor $R_8$.

The main differences between the circuit shown in FIG. 1 and the circuits shown in FIGS. 2 and 3 are that in the circuits shown in FIGS. 2 and 3 the first semiconductor circuit also functions as a part of the second semiconductor circuit, that in the circuits shown in FIGS. 2 and 3 only the power source $E_0$ serves for the power supply to the flash device T.

The advantage of the present invention is that the flash peak is accurately synchronized with the triggering for the discharge tube, as the triggering circuit is activated electronically by controlling the deenergization of the electromagnet M for shutter closure, and that the above advantage is obtained by a very simple circuit arrangement.

What is claimed is:

1. An automatic flashing circuit for a camera comprising a time constant circuit, a start switch for said time constant circuit, a first semiconductor circuit for shutter operation controlled by said time constant circuit, an electromagnet controlled by said time constant circuit through said first semiconductor circuit, a flashing device, a power source and a second semiconductor circuit for flash actuation, said flashing device being also controlled by said time constant circuit through said second semiconductor circuit.

2. An automatic flashing circuit for a camera according to claim 1 in which the time constant circuit comprises a capacitor and a variable resistor for setting photographic information such as film sensitivity, object distance or guide number.

3. An automatic flashing circuit for a camera according to claim 1 in which the first semiconductor circuit comprises at least one P-N-P type transistor and one N-P-N type transistor.

4. An automatic flashing circuit for a camera according to claim 2, wherein the time constant circuit further comprises a light receiving element for control of automatic exposure, and a change-over switch for selectively connecting either the variable resistor or the light receiving element to the capacitor.

5. An automatic flashing circuit for a camera comprising a common time constant circuit, a start switch for said common time constant circuit, a first semiconductor circuit for shutter operation controlled by said common time constant circuit, an electromagnet controlled by said common time constant circuit, a flashing device, a power source for energizing said flashing device, and a second semiconductor circuit controlled by the output of the first semiconductor circuit for actuating said flash device.

6. An automatic flashing circuit for a camera according to claim 4 in which the light receiving element is a photoconductor.

7. An automatic flashing circuit for a camera according to claim 4 in which the change-over switch is associated with a change-over member provided in the camera.

8. An automatic flashing circuit for a camera according to claim 5 in which the second semiconductor is a power transistor.

9. An automatic flashing circuit for a camera according to claim 5 in which the second semiconductor circuit includes a thyristor.

10. An automatic flashing circuit for a camera according to claim 5 in which the power source comprises a first power source which is a low voltage battery for actuation of the electromagnet and a second power source which is a high voltage battery for actuation of the flashing device.

11. An automatic flashing circuit for a camera according to claim 10 in which the flashing device comprises a discharge tube.

12. An automatic flashing circuit for a camera according to claim 1, wherein the time constant circuit includes a capacitor, said start switch being connected in parallel with said capacitor, said start switch being responsive to shutter opening, said electromagnet being connected to said first semiconductor circuit and associated with shutter closing.

13. An automatic flashing circuit for a camera according to claim 1, wherein the flashing device comprises a discharge tube.

14. An automatic flashing circuit for a camera, comprising a common time constant circuit, a start switch for actuating said common time constant circuit, a first semiconductor circuit for shutter operation controlled by said common time constant circuit, an electromagnet controlled by said time constant circuit, a flashing device having a power source, a second semiconductor circuit controlled by said time constant circuit for actuating the flash device, said second semiconductor circuit including a variable element for controlling the actuation time of the flashing device.

15. An automatic flashing circuit for a camera according to claim 4, wherein said change-over switch is associated with an activator switch which actuates only when the variable resistor is connected with said capacitor.

* * * * *